Feb. 10, 1953 F. H. HUBBARD 2,627,822
DOUGH LAMINATING APPARATUS
Filed Nov. 4, 1950 3 Sheets-Sheet 1
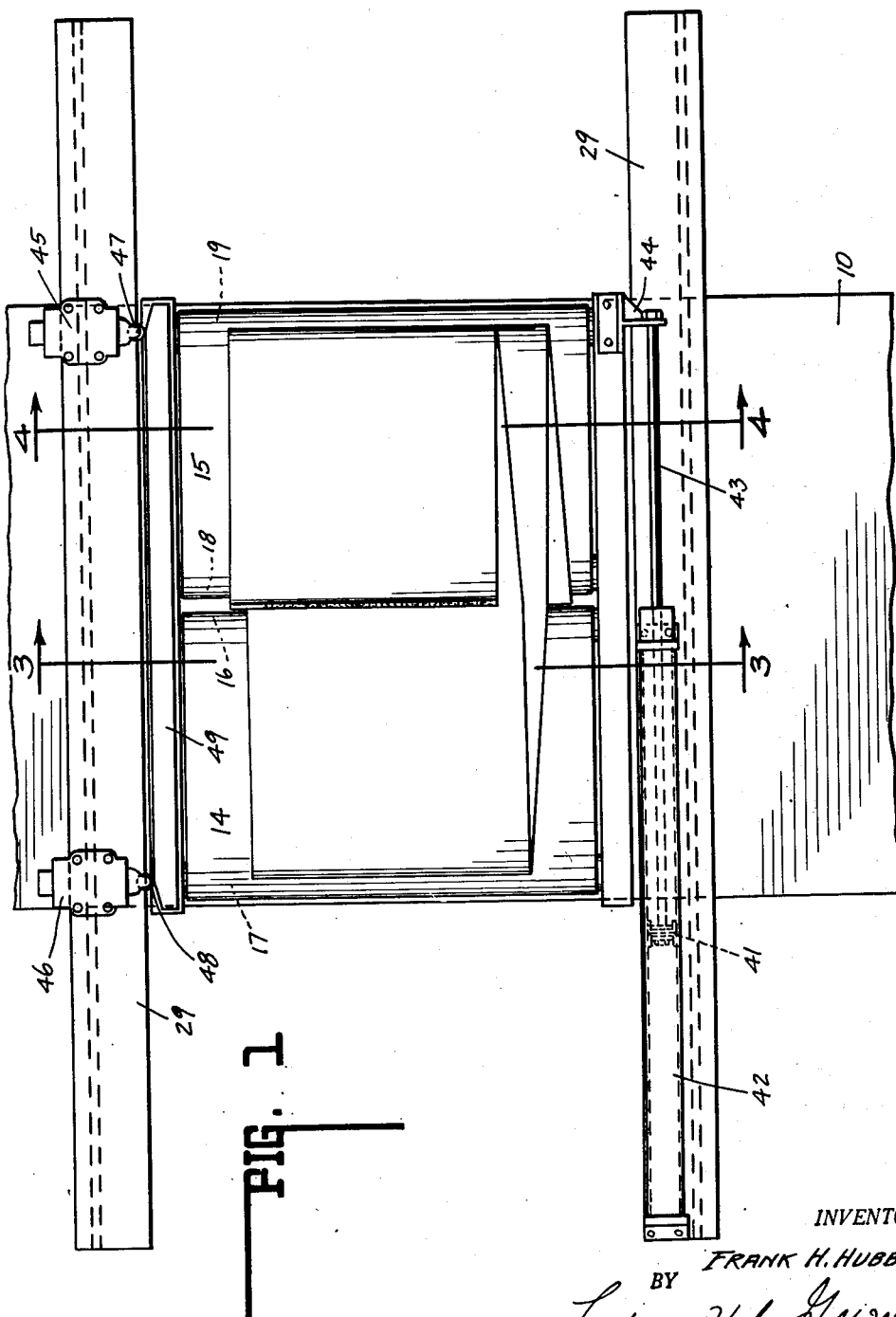
INVENTOR.
FRANK H. HUBBARD.
BY
Lockwood, Hahn, Galt & Woodard.
ATTORNEYS.

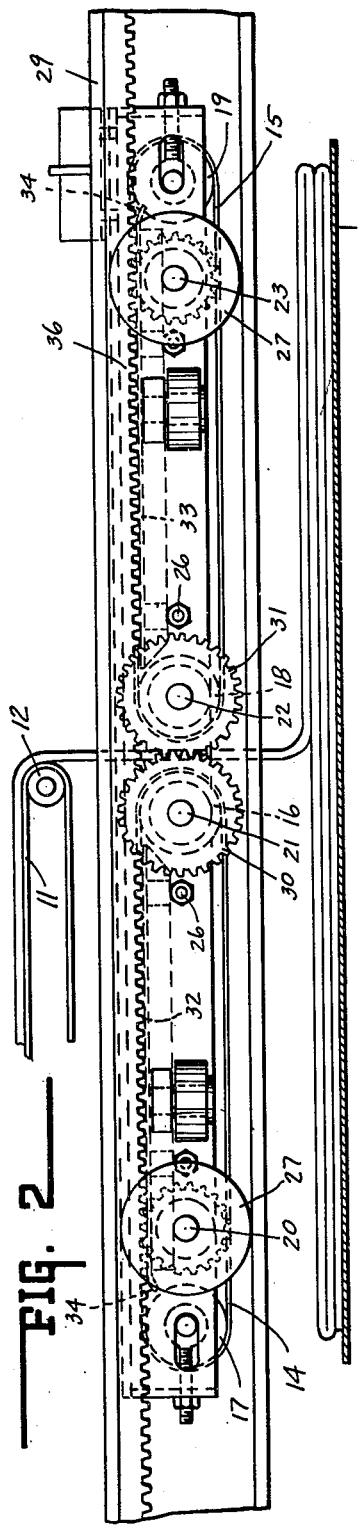
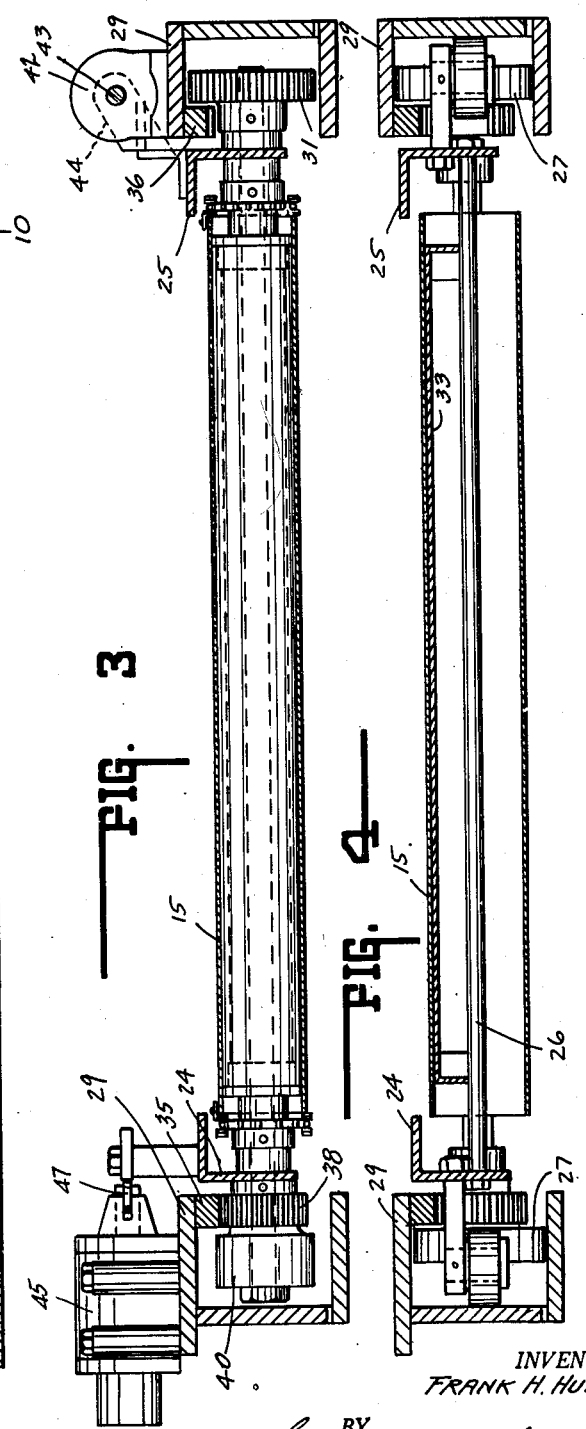

Feb. 10, 1953 — F. H. HUBBARD — 2,627,822
DOUGH LAMINATING APPARATUS
Filed Nov. 4, 1950 — 3 Sheets-Sheet 3
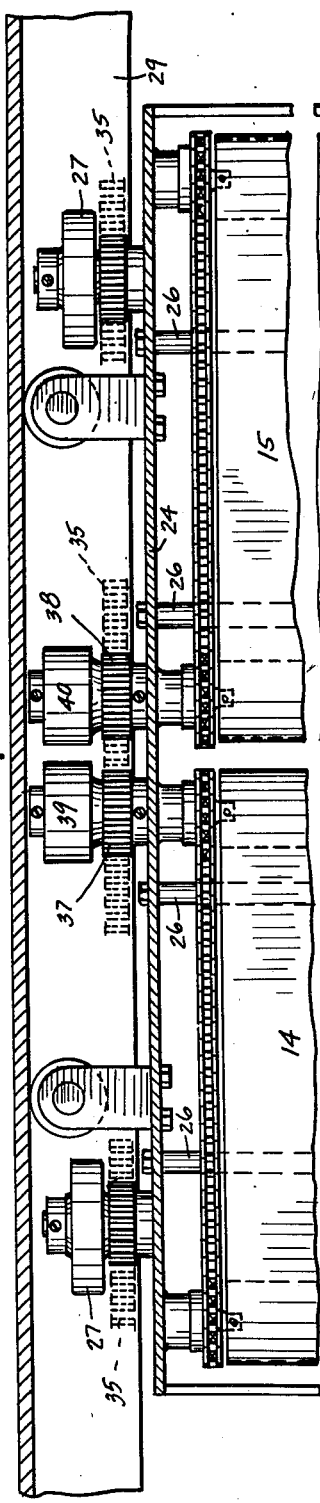
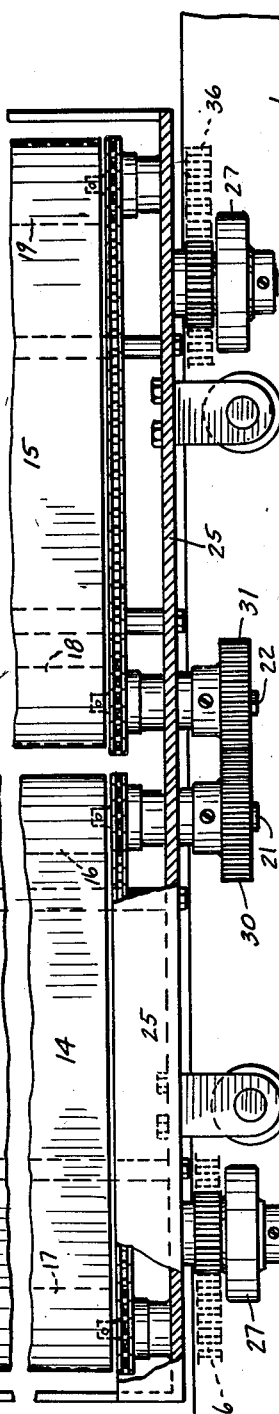
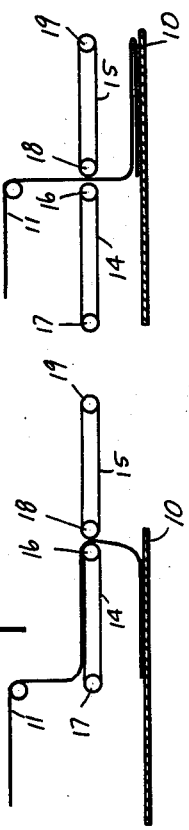
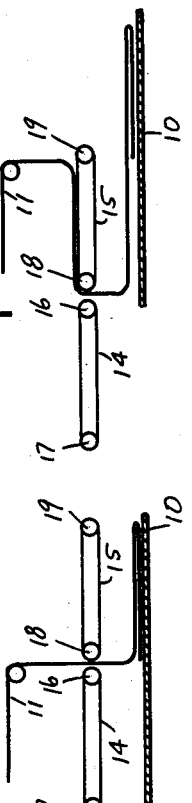
INVENTOR.
FRANK H. HUBBARD.
BY Lockwood, Hahn, Galt & Woodard,
ATTORNEYS.

UNITED STATES PATENT OFFICE 2,627,822

DOUGH LAMINATING APPARATUS

Frank H. Hubbard, Indianapolis, Ind.

Application November 4, 1950, Serial No. 194,091

3 Claims. (Cl. 107—1)

The present invention relates to improvements in machines for folding sheeted dough.

In certain types of bakery goods, as, for instance, crackers, the prepared dough is initially rolled into relatively thin sheets and these sheets are then folded to provide a series of layers one on top of the other. The sheets are then cut to the desired size and the dough baked to produce, in the example referred to, crackers. It is desirable when folding these sheets that each fold or lamination be slightly offset from the next preceding lamination.

The present machine is designed to handle a continuous sheet of dough, effect the folding of the same, to provide a series of laminations and to provide means whereby each lamination is slightly offset from the next preceding lamination.

While I have referred particularly, as an example, to dough for producing crackers, it will be understood of course that the present machine will handle various types of dough such, for instance, as sponge or sweet dough. In fact, the machine is designed to handle most any type of dough wherein the dough is rolled into sheet form and it is desired to laminate the same.

In the embodiment of the machine illustrated Fig. 1 is a plan view of a machine embodying my invention with certain parts broken away to illustrate more fully the laminated arrangement of the dough.

Fig. 2 is a side elevation of the machine illustrated in Fig. 1 showing more particularly the lapping conveyor means, with one of the guide members removed in order to show greater detail of construction.

Fig. 3 is a sectional view taken on the line 3—3 of Fig. 1.

Fig. 4 is a sectional view taken on the line 4—4 of Fig. 1.

Figs. 5, 6 and 7 are diagrammatic views showing the progressive movement of the lapping conveyors for depositing the sheeted dough on the receiving conveyor.

Fig. 8 is a plan view of the apparatus with parts removed to show in detail certain working parts of the structure.

In the embodiment illustrated I provide a traveling conveyor 10 to provide a dough supporting run lying in a continuous plane and which may be driven by any suitable means. Said conveyor is adapted to receive the sheeted dough from a lapping apparatus disposed above the conveyor and adapted to travel transversely of the line of travel of the conveyor. This lapping apparatus in turn is adapted to receive a continuous sheet of dough from a feeding means which may consist of a continuous conveyor 11 operating over suitable rollers 12 and adapted to feed the sheet into the lapping apparatus.

The lapping device or structure comprises a pair of continuous belts 14 and 15. The belt 14 is adapted to travel over spaced apart rollers 16 and 17 and the belt 15 is likewise adapted to travel over spaced apart rollers 18 and 19. The rollers 16 and 18 with their associated belts form a throat through which the sheeted dough is adapted to be fed from the conveyor 11 onto the conveyor 10, while the belts 14 and 15 constitute, in effect, dough supporting runs on which the sheeted dough is adapted to lie during the folding operation, as will appear more fully hereinafter.

The sheeting means including the belts 14 and 15 is disposed transversely of the conveyor 10 and is adapted to bodily move transversely of the conveyor. To this end the shafts 20 and 21 of the rollers 16 and 17 and the shafts 22 and 23 of the rollers 18 and 19 operate or extend through a pair of side members 24 and 25 which, in effect, constitute the side members of a frame extending the entire length of the two sets of belts 14 and 15 and their associated parts. These side members are connected together by stretcher members 26 which extend between the same and together with the side members provide a rigid frame carrying the shafts for the rollers of the belts.

The shafts 20 and 23 are each provided with rollers or travel wheels 27 which in turn operate within side guide members 29, stationarily mounted in any suitable manner and constituting supporting means for the lapping apparatus. The front roller shafts 21 and 22 are provided with intermeshing gears 30 and 31 which insure the movement of the belts 14 and 15 in unison as the lapping structure as a whole is bodily moved transversely of the conveyor 10.

Notice should be made of the fact that the top runs of the belts 14 and 15 rest upon supporting tables 32 and 33 which are supported upon cross bars, said tables having downturned ends as at 34 which in turn rest upon the stretcher bars 26.

In order to impart a rotary movement to the rollers 16 and 18 and accordingly a movement of the belts 14 and 15, I provide a rack and gear drive which comprises a pair of racks 35 and 36 disposed on opposite sides and supported in the guide members 29. These rack members 35 and 36 extend the full length of the travel of the lapping conveyors although only one of the rack members 35 constitutes a drive for the rollers 16 and 18. The opposite rack member 36 merely constitutes a guide for the parts. The rack member 35 is adapted to be engaged by and to drive the gears 37 and 38 respectively for the shafts 21 and 22 of the rollers 16 and 18. This drive is effected through overrunning clutches 39 and 40 providing a drive connection respectively between the gear 37 and the shaft 21 and the gear 38 and the shaft 22. The overrunning, or one-way clutches 39 and 40 are adapted to drive in opposite directions.

It being understood that the racks 35 and 36 are disposed above the gears which are adapted to engage therewith, when the lapping conveyors are moved to the left, looking at Fig. 8, the overrunning clutch 39 will engage and accordingly a drive will be established through the medium of the rack member 35, the gear 37, the overrunning clutch 39, which engages in this direction, the gears 30 and 31. Accordingly the shafts 21 and 22 will be driven to advance the conveyors 14 and 15 towards one another. Likewise, when the lapping conveyors are moved to the left the overrunning clutch 40 will engage and as a result with the gear 38 engaging the rack member 35 the shaft 22 will be driven in turn driving the shaft 21 through the gears 30 and 31 and likewise the conveyors 14 and 15 will be moved towards one another. In this instance it will be observed that the conveyors 14 and 15 move toward one another and as a result the conveyors will be moved to feed the dough downwardly through the throat formed between the spaced apart ends of the conveyors as they travel over rollers 16 and 18.

In order to understand more fully the operation of the lapping apparatus reference may be had to Figs. 5, 6 and 7. Initially the feeding throat formed between the rollers 16 and 18 is in alignment with the end of the feeding conveyor 11. Accordingly the sheet of dough feeds downwardly between the feeding rollers and, assuming that the first bodily movement of the throat and accompanying parts is to the right, the parts move to the position illustrated in Fig. 5 wherein it will be apparent that as the sheet of dough feeds between the rollers 16 and 18 it will lie flatwise on the travelling conveyor and at the same time a portion thereof will lie flatwise on the travelling belt 14, it being understood that during this movement the belts are driving in opposite directions toward each other.

On the return movement of the lapping apparatus towards the left the overrunning clutch 40 will disengage while the overrunning clutch 39 will engage, thereby causing the belts 14 and 15 and the rollers 16 and 18 to continue to move with the rollers 16 and 18 moving as before in opposite directions towards one another. This return movement to what may be called the center point, that is, the point immediately beneath the feeding conveyor 11, is an extremely rapid movement permitting in effect the belt 14 to move from under the layer of sheeted dough lying on the top thereof and preventing a lapping of the dough from the feeding conveyor onto that portion already lying on the conveyor 14.

As a result of this movement the layer of dough is dropped from the conveyor 14 onto the receiving conveyor 10 in a fold in the position illustrated in Fig. 6. The continued left hand movement of the feeding conveyors will then effect a laying of the sheeting dough on to the conveyor 15 in the manner as heretofore described with respect to the conveyor 14. As soon as the feeding conveyors or aprons move to the extreme left as illustrated in Fig. 7, a wide sheet of dough is laid on the receiving conveyor 10 as shown in Fig. 7 and from then on the lapping procedure takes place each time a full lap is deposited on the receiving conveyor.

It is to be remembered that the travelling conveyor is moving in a direction transverse of the travel of the lapping mechanism and accordingly during the slow movement of the lapping mechanism the travelling conveyor will move the initially deposited layer or layers of dough slightly beyond the edge of the next succeeding layer.

It will be understood that the movement or travel of the conveyor 10 compared to the reciprocal movement of the lapping apparatus is relatively slow. Approximately the reciprocating movement of the lapping apparatus is about nine times as fast as the travel of the conveyor 10 so that the offset of the edges of the lapped dough is quite slight.

The reciprocation of the lapping apparatus is effected through fluid pressure and to this end I provide a piston 41 operating in a fluid pressure cylinder 42. This piston is provided with a piston rod 43 which is connected to a bracket 44 attached to one of the side members 25. The air under pressure is alternately admitted to the cylinder on the opposite sides of the piston 41 by a controlling valve operated by suitable cam mechanism not hown.

In order to effect, however, the fast and slow movement of the frame I provide controlling valves 45 and 46 mounted on one of the side members or tracks 29 which valves are provided with rollers 47 and 48 adapted to be engaged by an elongated controlling cam 49. The valve 45 controls the amount of fluid under pressure supplied to the cylinder 42 on the right hand side of the piston 41 and the valve 46 controls the extent of fluid pressure admitted to the cylinder 42 on the left hand side of the piston 41. When the lapping apparatus is moved with the feeding throat at its extreme left handed position (Fig. 7) the roller 47 is out of contact with the cam 49 and accordingly the valve 45 is wide open. Under these circumstances when fluid under pressure is admitted to the cylinder 42 at the left of the piston 41 full fluid pressure will pass through the valve 45 imparting a rapid movement of the piston 41, to the right, and accordingly moving the lapping mechanism rapidly to the right. This rapid movement occurs until the right hand end of the cam 49 strikes the roller 47 operating to partially close the valve 45, thereby cutting down the amount of fluid pressure admitted behind the piston 41 and accordingly slowing down the movement of the lapping apparatus further to the right.

This slowing down movement takes effect at the point where the throat is immediately beneath the feeding conveyor 11 so that the continued movement to the right from this point on is relatively slow. The same effect is produced by the valve 46 when the reversal movement takes place.

The invention claimed is:

1. An apparatus for folding dough sheets comprising a receiving conveyor having its dough supporting run lying in a continuous plane, means for continuously moving said conveyor in one direction, a pair of oppositely directed and aligned endless belts having their dough supporting runs supported above and in spaced parallel relation to said conveyor, the adjacent end portions of said belts being spaced from each other to provide a dough feeding throat, means for advancing each of said belts in opposite directions and toward one another transversely of said conveyor, supporting members for said belts, means for reciprocating said belt supporting members and belts jointly and simultaneously as a unit transversely of said conveyor to cause said throat to move from one side of said conveyor to the other in parallel relation thereto as said belts advance towards each other, and means for delivering a continuous sheet of dough onto said belts alternately during their joint transverse movement for continuous delivery of said dough to and through said throat onto said conveyor.

2. An apparatus for folding dough sheets comprising a receiving conveyor having its dough supporting run lying in a continuous plane, a pair of oppositely disposed and aligned endless belts each movable toward each other and having their dough supporting runs extending in a plane parallel to and spaced above said conveyor and transversely thereof, said belts being mounted to reciprocate in said plane as a unit with a gap therebetween to provide a dough feeding throat, means for delivering a continuous sheet of dough onto said belts, and driving mechanism for advancing said belts toward each other and simultaneously reciprocating them as a unit from one side of said conveyor to the other to alternately receive said dough and deliver it through said throat for lapping thereof on said conveyor.

3. An apparatus for folding dough sheets comprising a receiving conveyor having its dough supporting run lying in a continuous plane, means for delivering a continuous sheet of dough thereto in lapped relation thereon including a pair of oppositely disposed and aligned belt units having their dough supporting runs disposed transversely to said receiving conveyor and having their adjacent ends spaced to provide a dough feeding throat, means for supporting and jointly reciprocating said belt units and their dough supporting runs together in the same plane transversely of and in parallel spaced relation to said conveyor, and means for advancing the belts of said units in opposite directions and toward each other during their joint reciprocation for alternately receiving and delivering said dough sheet and feeding it to and through said throat upon said conveyor.

FRANK H. HUBBARD.

REFERENCES CITED

The following references are of record in the file of this patent:

UNITED STATES PATENTS

| Number | Name | Date |
|---|---|---|
| 777,349 | Mitchel | Dec. 13, 1904 |
| 881,439 | Peters | Mar. 10, 1908 |
| 1,455,120 | Peters et al. | May 15, 1923 |
| 1,482,195 | Kern et al. | Jan. 29, 1924 |
| 1,762,268 | Green | June 10, 1930 |
| 2,130,097 | Loose et al. | Sept. 13, 1938 |